United States Patent
Dahari (10) Patent No.: US 7,139,387 B2
(45) Date of Patent: Nov. 21, 2006

(54) METHOD AND SYSTEM FOR INTEGRATING MULTI SERVICES FOR INTELLIGENT NETWORKS

(75) Inventor: Aviram Dahari, Kiryat-Gat (IL)

(73) Assignee: Outsmart Ltd (IL)

( * ) Notice: Subject to any disclaimer, the term of this patent is extended or adjusted under 35 U.S.C. 154(b) by 171 days.

(21) Appl. No.: 10/274,077

(22) Filed: Oct. 18, 2002

(65) Prior Publication Data

US 2004/0076281 A1 Apr. 22, 2004

(51) Int. Cl.
*H04M 7/00* (2006.01)
*H04M 3/42* (2006.01)

(52) U.S. Cl. ............. 379/229; 379/207.02; 379/221.08
(58) Field of Classification Search ........... 379/201.02, 379/201.05, 207.02, 221.08, 221.09, 221.1, 379/221.12, 229, 230
See application file for complete search history.

(56) References Cited

U.S. PATENT DOCUMENTS

| 5,581,610 | A * | 12/1996 | Hooshiari | 379/133 |
| 5,852,660 | A * | 12/1998 | Lindquist et al. | 379/230 |
| 5,963,630 | A * | 10/1999 | Dabbs et al. | 379/201.01 |
| 6,377,676 | B1 * | 4/2002 | Figurski et al. | 379/230 |
| 6,560,326 | B1 * | 5/2003 | Clark | 379/221.09 |

* cited by examiner

*Primary Examiner*—Bing Q. Bui
(74) *Attorney, Agent, or Firm*—Fleit Kain Gibbons Gutman Bongini & Bianco; Martin Fleit; Paul D. Bianco (57) ABSTRACT

The invention includes a router and adapter enabling to receive any type of vendor Intelligent Network protocol message, then to direct the message (according to predefined rules) and ultimately, to translate one type of message into a unified format in order to meet with the destination protocol requirements and the mediating method according to the present invention enable communication between different (SSP) telephone message switching protocols and different control point system (SCP) message protocols; the method is based on conversion processes that enable identification of message definitions and information and the creation of unified message records.

9 Claims, 9 Drawing Sheets

METHOD AND SYSTEM FOR INTEGRATING MULTI SERVICES FOR INTELLIGENT NETWORKS

FIELD AND BACKGROUND OF THE INVENTION

The present invention relates to telephony systems and, more particularly, to a telephony system that enables telephony service providers to use various Intelligent Network services.

With the growing need to respond to a wide variety of requirements for communications, consideration has been directed toward making networks highly intelligent. Hence, the IN (Intelligent Network) has been proposed for this purpose.

An Intelligent Network (IN) is a service-independent telecommunications network. That is, intelligence is taken out of the service switching point (also referred to as SSP) and is handled by service control points (SCP) where the service logic is located. This provides the network operator with the means to develop and control services more efficiently. In such an IN, a plurality of intelligent peripherals (will be abbreviated to IP) and pluralities of vender feature nodes (VFN) are used as terminal devices.

Each of the terminal devices is connected to a service control point (SCP) through a service switching point (SSP), which is operable in a manner similar to a conventional exchange system. Each of the SCPs is managed by a service management system (SMS), which has a database. Having the service control points located separately from the switching facilities allows services to be added or changed without having to redesign switching equipment.

By way of illustration, a call handling procedure in a conventional IN based prepaid system is performed as follows:

A prepaid subscriber dials a number that is received by a service switching point (SSP) at the telephone company central office.

The SSP detects the event and sends a query request to the SCP based on the call source and destination and additional billing rules located in the database.

The SCP returns the SSP corresponding charging parameters and the maximum call duration allowed. If the subscriber's balance is lower then the amount required for making the call, the call request is denied. Otherwise the SSP connects the subscriber to the destination requested, and upon termination of the call a charge request sent to the SCP.

Other examples of services that may be provided by SCP include area number calling, disaster recovery and do not disturb services.

The SSP communicates with each SCP by transmittal of a service control request message (from the SSP to the SCP). The SCP executes a call control operation, which provides service to a user connected through the SSP. The call control operation is determined by the service control request message.

Therefore, in conventional Intelligent Networks, the SCP should be designed to respond to the service control request message and to provide the service to each user as long as the service control request message has the format determined for the SCP.

In practice the SSP may not always be connected to terminal devices that have the service control request message of the same format, but may be connected to a plurality of terminal devices that are different in species from one another. In this case, the SCP is supplied from each of the terminal devices through the SSP with service control request messages of format that are different from one another in order to specify the species of the terminal devices.

In addition, at times, a new model SSP may partially substitute an old model of SSP, both of which may be connected to the same SCPs. According to prior art it is impossible for an SCP to communicate with both SSPs.

Hence, in conventional Intelligent Networks, each SCP can neither respond to different service control request messages nor cope with the coexistence of the old and the new model SSPs. Simply put, each user (SSP) is designed to communicate with one specific SCP.

This situation, whereby an SSP can only be defined to communicate with a specific SCP, creates a limitation for telecom providers. A company providing telecom services, which has purchased an Intelligent Network platform from a certain vendor, will probably need to purchase all additional Intelligent Network services and solutions from the same vendor. For example, if a telecom service provider has purchased an Ericsson switchboard he would be obliged to use Ericsson SCP to supply the additional Intelligent Network solution This limitation becomes more acute when the same telecom provider is interested in an additional service that only a second vendor can provide. In this case, the telecom provider would not be able to purchase additional services since the provider's SSP can only send the request to the originally defined SCP.

A possible way to get round the limitation created by the prior art is to relate the Intelligent Network service to designated numbers rather than to a specific user. The problem created using this solution is that the telecom provider would not be able to relate each service to a destination number but to a range of numbers, making the procedure impossible to manage.

Another deficiency of the prior art Intelligent Network service configuration is that two different services can't be integrated. For example, if a virtual number service and prepaid costumer service are from different equipment providers, the operator is unable to provide integrated service, thus the operator needs to build a new integrated service.

IN platforms are complex systems and require in-depth understanding of their architecture and protocols. Although IN standards such as CS-1 and CS-2 were defined and accepted by the industry, each switch vendor enhances its protocol so more capabilities can be added. Newer standards such as CAMEL and PARLAY are not yet widely adopted by the industry and it will take the vendors a few years to implement and market them. This makes things more difficult and more complicated for IN solution developers.

Prepaid systems are closed systems. They do not provide any open API for third party developers in order to integrate with these systems and exploit the capabilities of prepaid infrastructure. Thus many Data and Value Added Services (VAS) providers are not able to integrate to prepaid systems and are unable to offer these services to prepaid subscribers.

Telecom operators invest millions of dollars and a great deal of time in buying, assimilating and operating prepaid systems. Replacing or upgrading these systems is done every few years due to the high costs involved. Thus telecom operators are looking for a low cost solution that can offer an easy way to interconnect Data and VAS with the prepaid systems, thus enabling them to maximize revenues from existing and new services.

Telecom operators invest time and money in developing services that cannot communicate with one another. In order to provide integration of different services, the operators need to buy a new service and manage plural provisional databases.

SUMMARY OF THE INVENTION

The invention essentially comprises of a router and adaptor. INRA (Intelligent Network Router Adapter) is able to receive any type of vendor Intelligent Network protocol message, then to direct the message (according to predefined rules) and ultimately, to translate one type of message into a unified format in order to meet with the destination protocol requirements.

The mediating method according to the present invention enables communication between different (SSP) telephone message switching protocols and different control point system (SCP) messages protocols.

The mediating method is based on conversion processes that enable identification of message definitions and information and the creation of unified message records.

The mediating system according to the present invention is comprised of:
 SSP conversion modules for identifying SSP message definitions and information and creating unified message records.
 SCP conversion modules for identification of SSP message definitions and information and creation of unified message records.
 Management modules for checking the message destinations and routing the messages accordingly;
 SSP ands SCP protocols database.

BRIEF DESCRIPTION OF THE DRAWINGS

These and further features and advantages of the invention will become more clearly understood in the light of the ensuing description of a preferred embodiment thereof, given by way of example only, with reference to the accompanying drawings, wherein.

DESCRIPTION OF THE PREFERRED EMBODIMENTS

The invention essentially comprises of a router and adaptor. INRA (Intelligent Network Router Adapter) is able to receive any type of vendor Intelligent Network protocol message, then to direct the message (according to a predefined rules) and ultimately, to translate one type of message into a unified format in order to meet with the destination protocol requirements.

The main concept of the present invention is to provide telecom providers with an integrated solution for using Intelligent Network services of different vendors and matching between switching systems, which use different protocol mechanisms.

The invention suggests using a new mediating communication method and system that enables all types of switching systems to communicate with all types of service control points.

Figure 1:
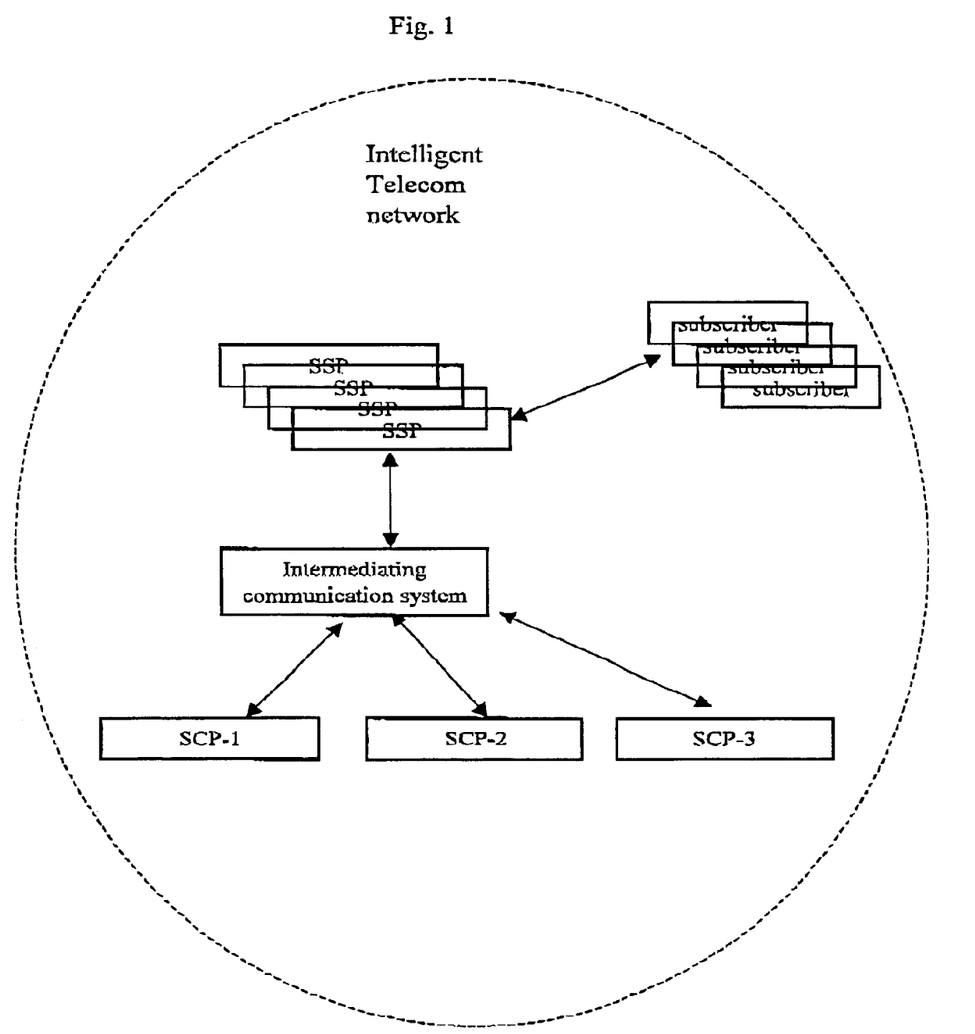
FIG. 1 is a general diagrammatic representation of the environment in which the present invention is practiced.

The mediating communication system is implemented within a designated communication server as seen in FIG. 1.

Figure 2:
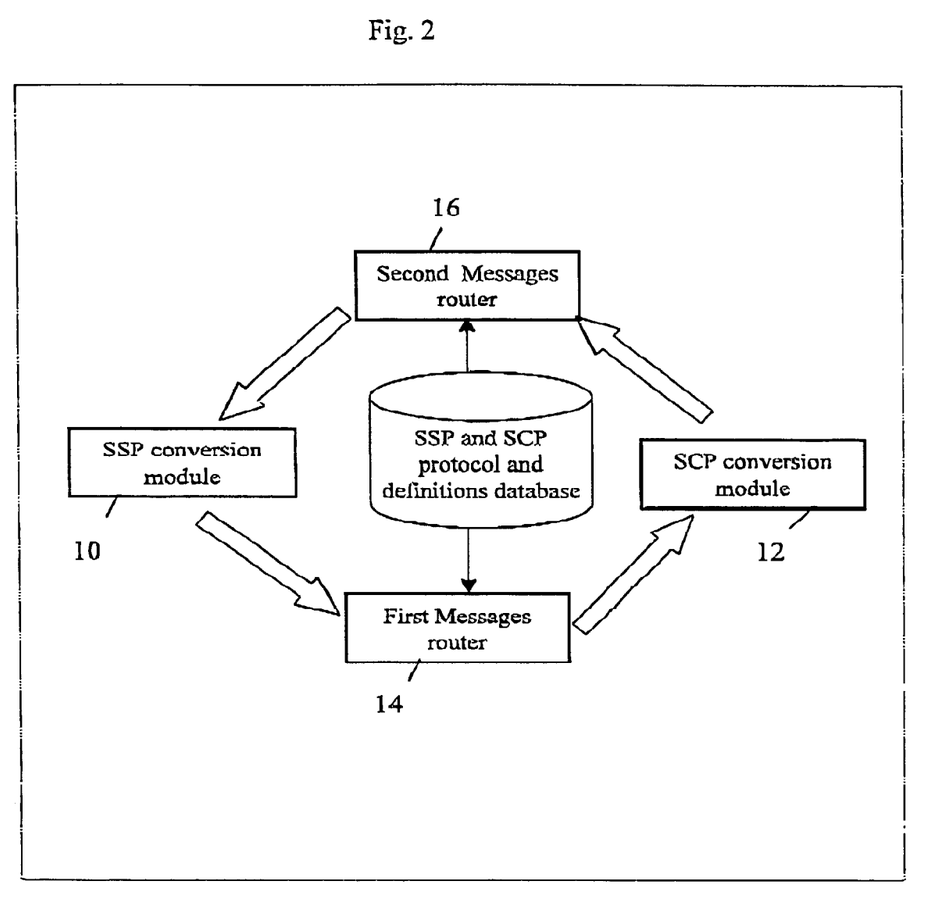
FIG. 2 is a block diagram of the mediating system according to the present invention.

FIG. 2 illustrates the essential components of the mediating system. The system comprises of conversion modules 10 and 12 for translating messages of one protocol to a second protocol, message routers 14 and 16 for identifying the target SSP or SCP and diverting the message accordingly, and a database 18 containing technical information of the different SSP and SCP systems.

The SSP conversion module 10 is programmed to translate any type of SSP message to a unified service request message data format, which represents the original message definitions and parameters. The first router 14 identifies the message's designated SCP and diverts the message to the second converter 12 in order to create the proper SCP request. The request is transmitted to the respective SCP and in return the SCP response is received. This response is converted into a unified SCP response that represents the original SCP response definitions and parameters. The unified response is analyzed by the second router 16 for the purpose of identifying the source SSP and is then diverted to the SSP converter 10 in order to create the proper response message for the respective SSP.

Figure 3:
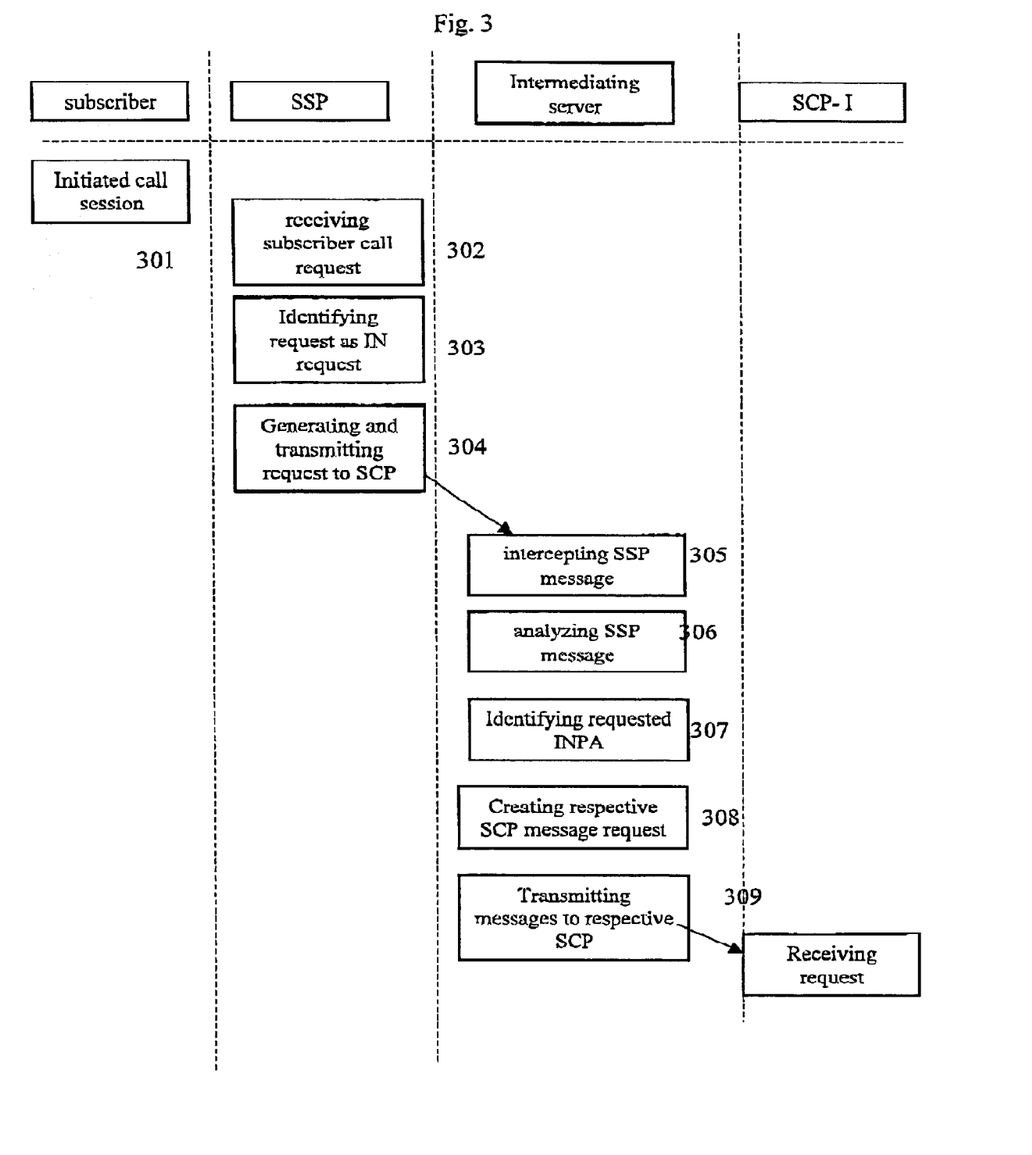
FIGS. 3 and 4 are flow-chart illustrating the flow process communication session between the subscriber, SSP and SCP systems according to the present invention.
Figure 4:
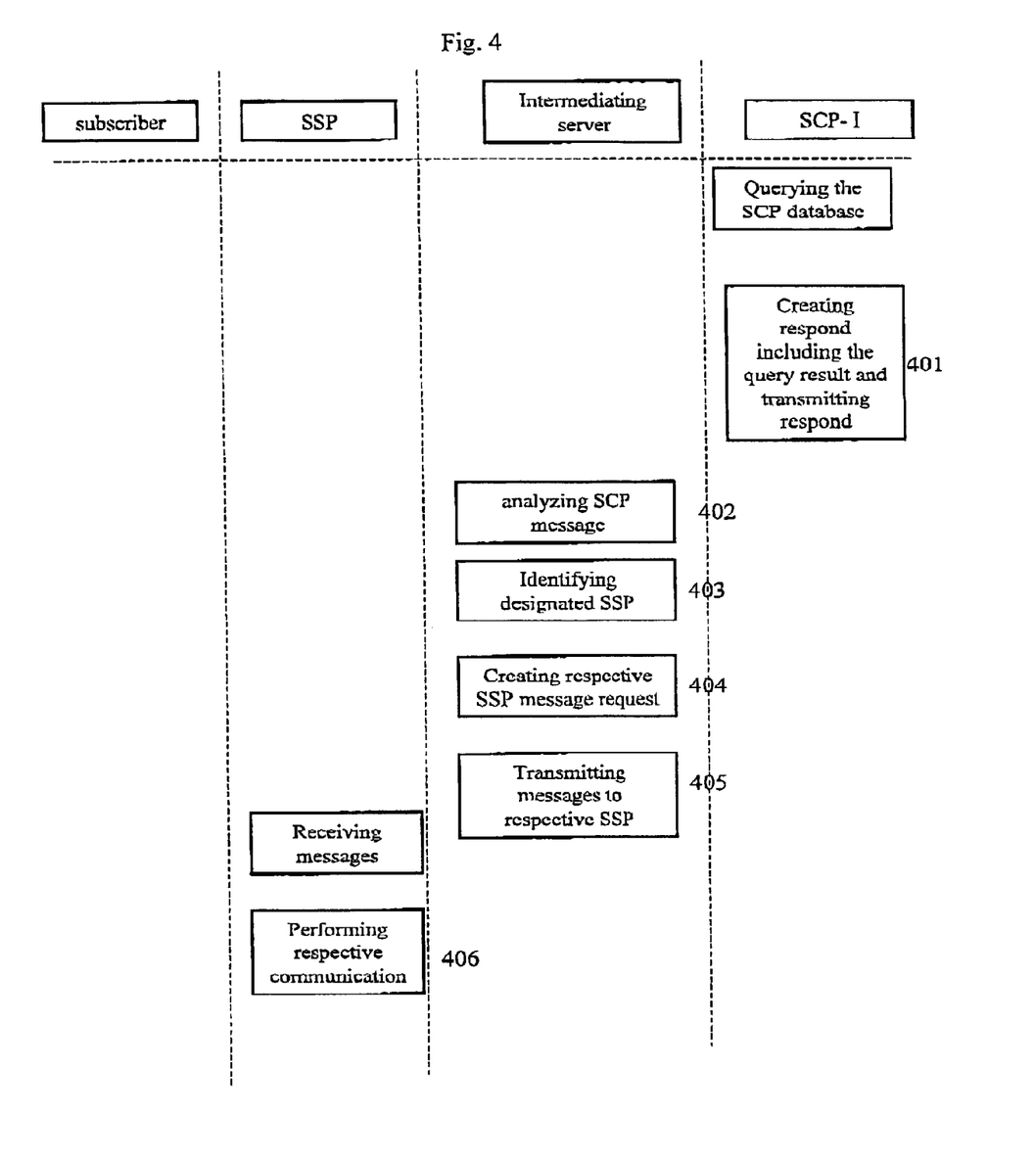

FIGS. 3 and 4 illustrate the intermediating process between at least one SSP system and at least one SCP system. Once a telephone call is initiated by a subscriber (301), the call request is received by the subscriber's SSP system (302). The SSP identifies the request (303) as an Intelligent Network request according to a pre-designated code (e.g. 1800) or any other identifying parameters. The SSP then initiates a query request (304) to an SCP system. For example, if a prepaid call is requested by a subscriber, the SSP initiates a request from the SCP regarding the subscriber's billing account. The request is intercepted by the intermediating communication system (305). This intermediating system analyzes (306) the message, identifies the message destination SCP (307) and creates the proper request message (308) adapted to the protocol of the designated SCP system. The SCP system receives the message (309) and performs a query accordingly.

According to the query result, a response message is prepared (401) and transmitted as a response to the original SSP message. This response message is intercepted by the intermediating system (402), which analyzes the response (403), identifies the SSP source system and creates (404) the proper response message adapted to the respective SSP protocol. The converted response message is transmitted (405) to the respective SSP system, which performs the respective switching operation (406) based on the response information. Taking a prepaid call as an example, the response message carries the subscriber billing account status information. If such information indicates that the account has no credit, the call session is terminated. Otherwise, the SSP will establish the connection between the subscriber and the desired designation.

Figure 5:
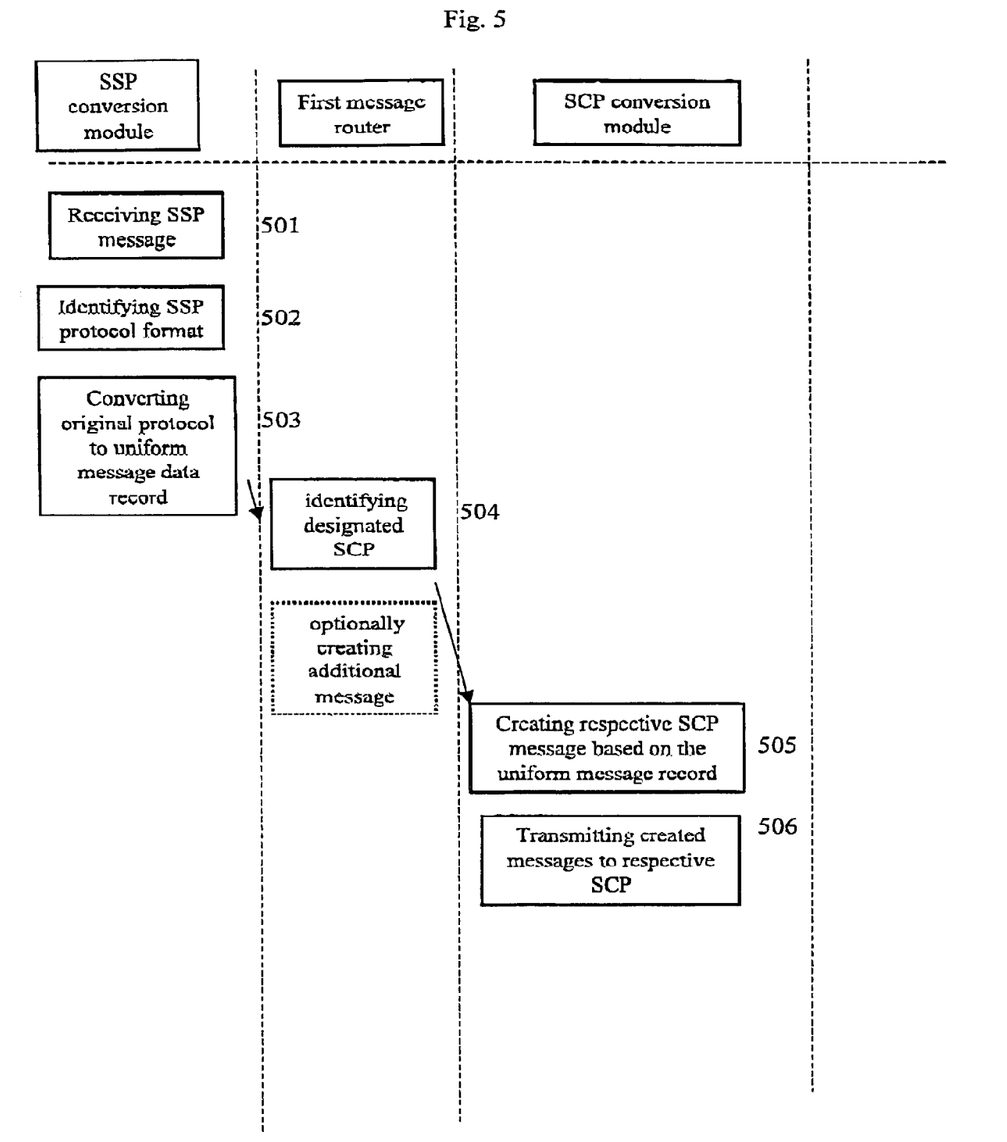
FIGS. 5 and 6 are a flow-chart illustrating the process of the communication session between the modules of the mediating systems according to the present invention.
Figure 6:
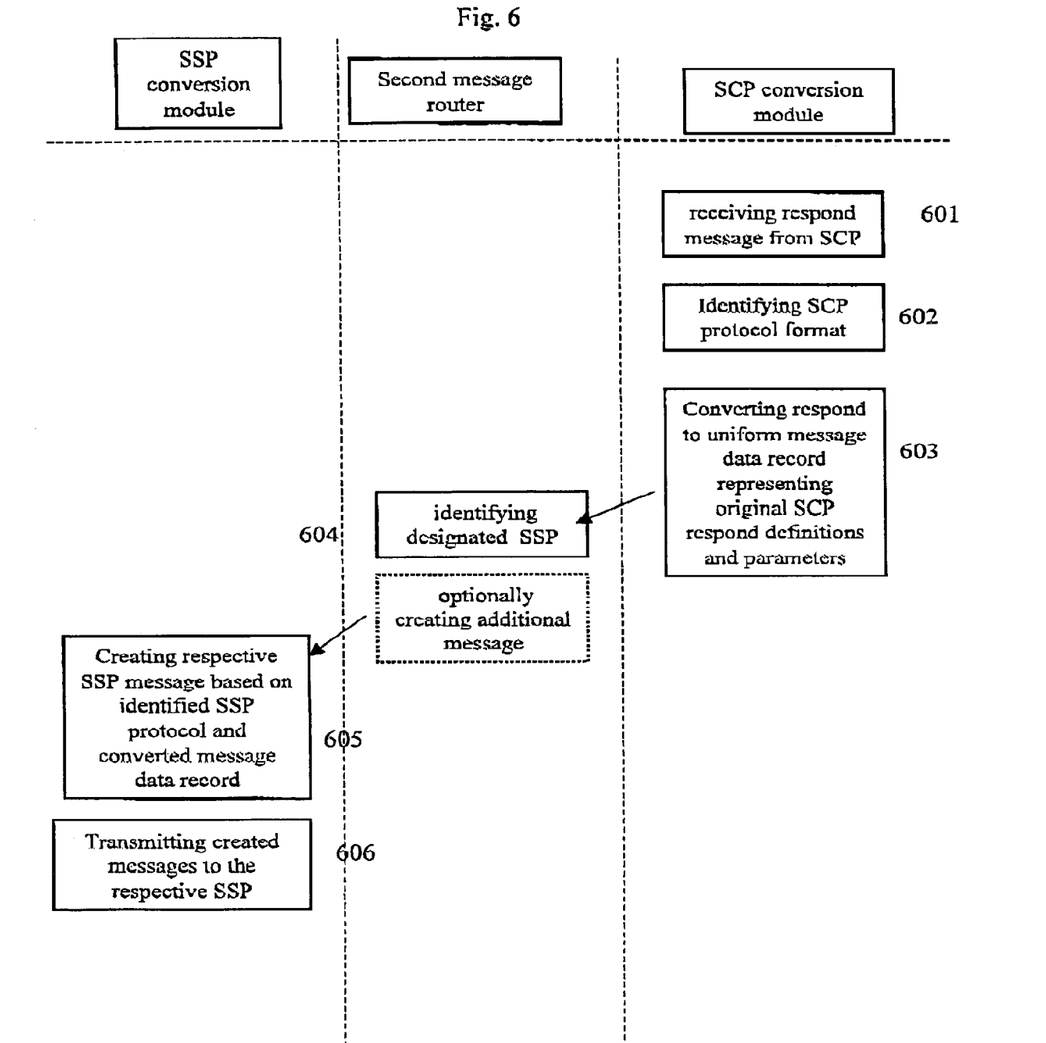

FIGS. 5 and 6 illustrate the process of handling the SSP and SCP messages by the intermediating system. Once an SSP message is intercepted by the intermediating system (501), the SSP converter identifies the SSP protocol (502) and converts the identified message into a unified message format (503). This conversion process identifies the specific message definition and parameters that are based on the known protocol of the identified SSP, and creates a unified data record, which includes all original message definitions. The data record is temporarily recorded in the system for the use of the routers and SCP converter. At a later stage, the message target SCP system is identified (504) and is diverted to an SCP converter. The SCP converter creates a request message (505) according to the target SCP protocol. The parameters of this new request message are based on the unified data record parameters. The created message is transmitted (506) to the respective SCP system.

When a response message from the SCP system is intercepted (601), the SCP converter identifies the SCP protocol (602) and creates a unified message data record (603), which includes all definitions and information of the original response. This conversion process is based on the known definition of the identified SCP protocol. The created data record is diverted to the second router, which relates the response message to the respective request message in order to identify (604) the source SSP protocol. The unified message record is diverted to the SSP converter. Based on the unified message record and the known SSP protocol, the SSP converter creates a message response (605) adapted to the respective SSP system including all information of the original SCP response.

Figure 7:
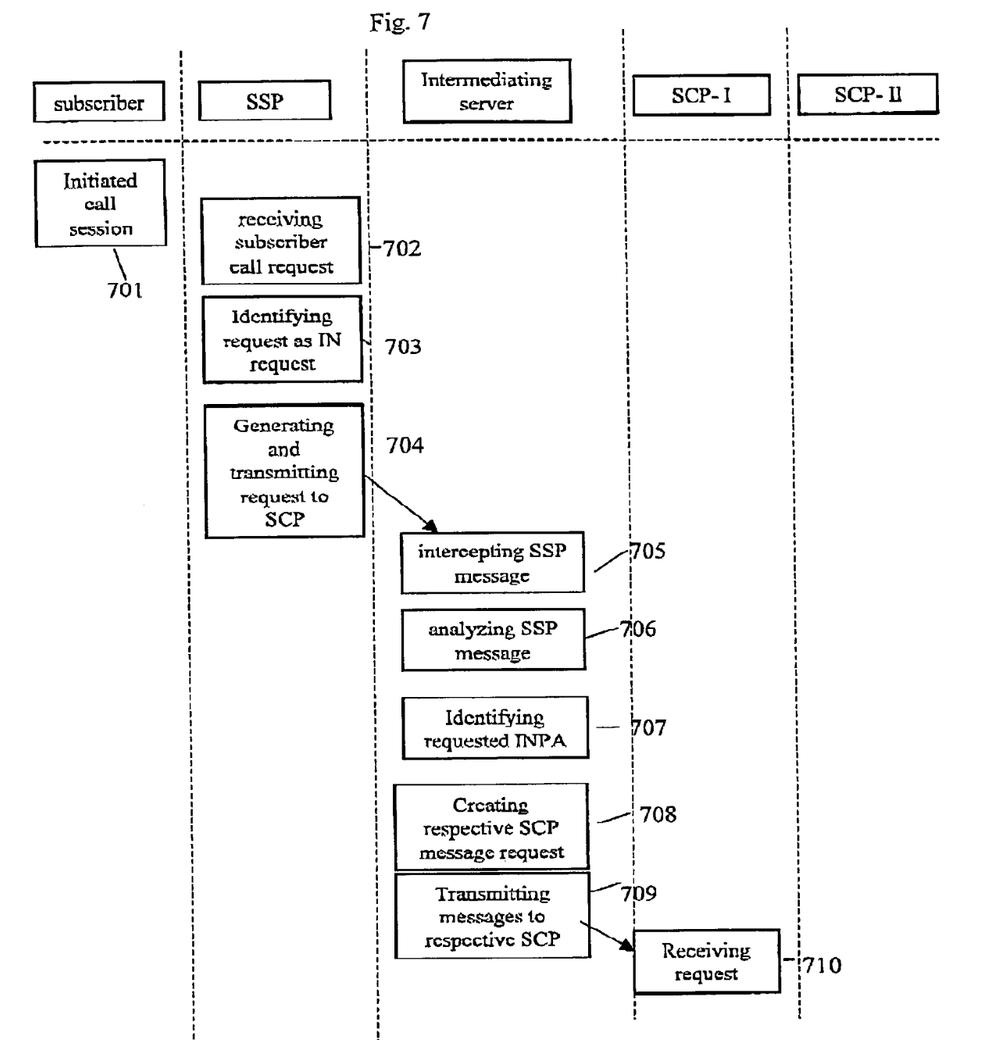
FIGS. 7, 8 and 9 are a flow-chart illustrating the process communication session for integrated services between the modules of the mediating systems according to the present invention.

According to an additional improvement of the present invention, the router creates two SSP request messages based on one original SSP request. The messages are designated to communicate with two different SCP systems, which in return transmit two response messages. These response messages are analyzed by the second router for the purpose of creating respective messages, which are then transmitted to the SSP system that originally created the first request message, FIG. 7 illustrates the process of handling the SSP and SCP messages wherein one SSP request is dependant on the other. Once a telephone call is initiated (701) by a subscriber, the call request is received by the subscriber's SSP system (702). The SSP identifies the request (703) as an Intelligent Network request according to pre-designated code (e.g. 1800) or any other identifying parameters and initiates a query request (704) to an SCP system. For example, if a prepaid call is requested by a subscriber, the SSP initiates a request from the SCP regarding the subscriber's billing account. The request is intercepted by the intermediating communication system (705). This intermediating system analyzes (706) the message, identifies the message destinations SCP (707) and creates the proper first request message (708) adapted to the protocol of a first designated SCP system and transmits it to the respective SCP (709). The first SCP system receives the message (710) and performs a query accordingly.

Figure 8:
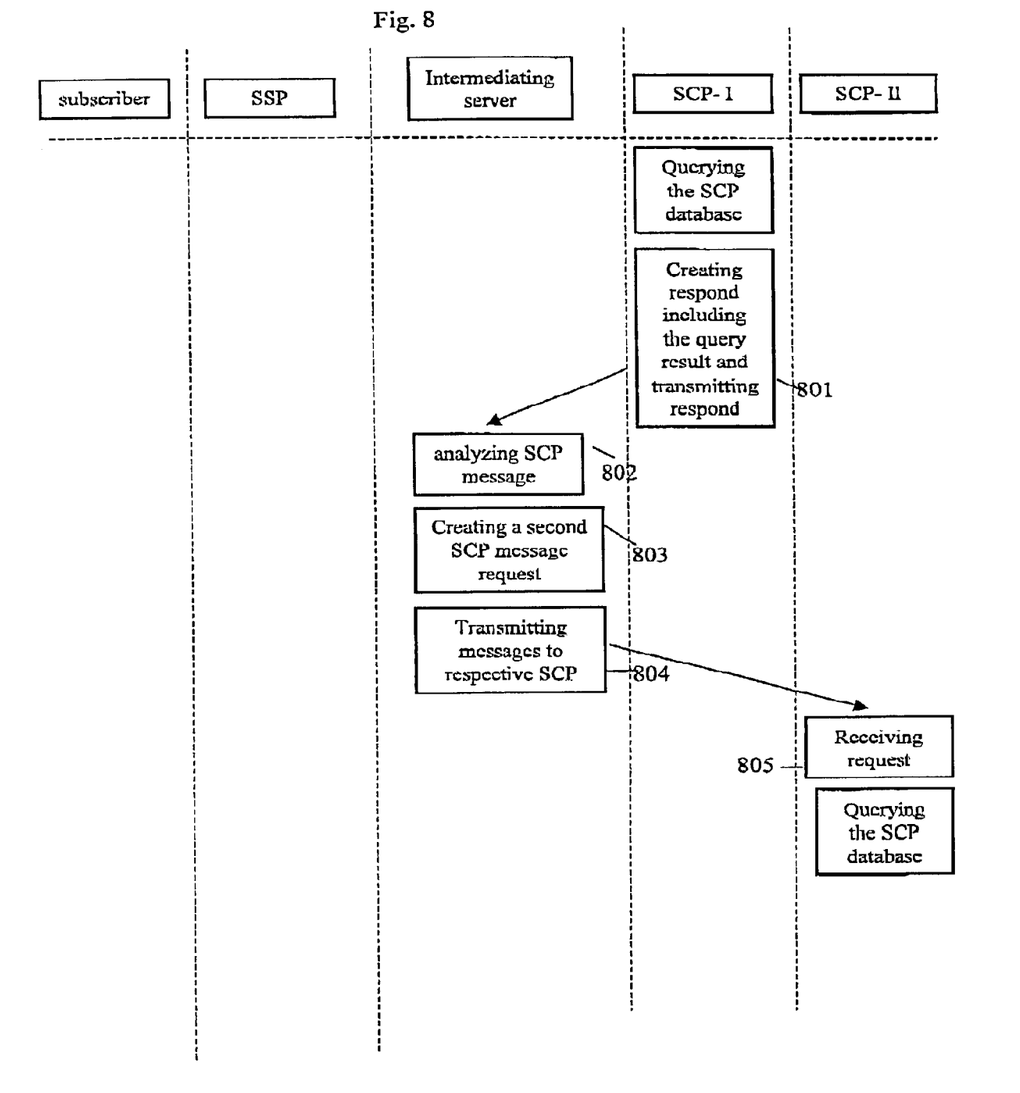
Figure 9:
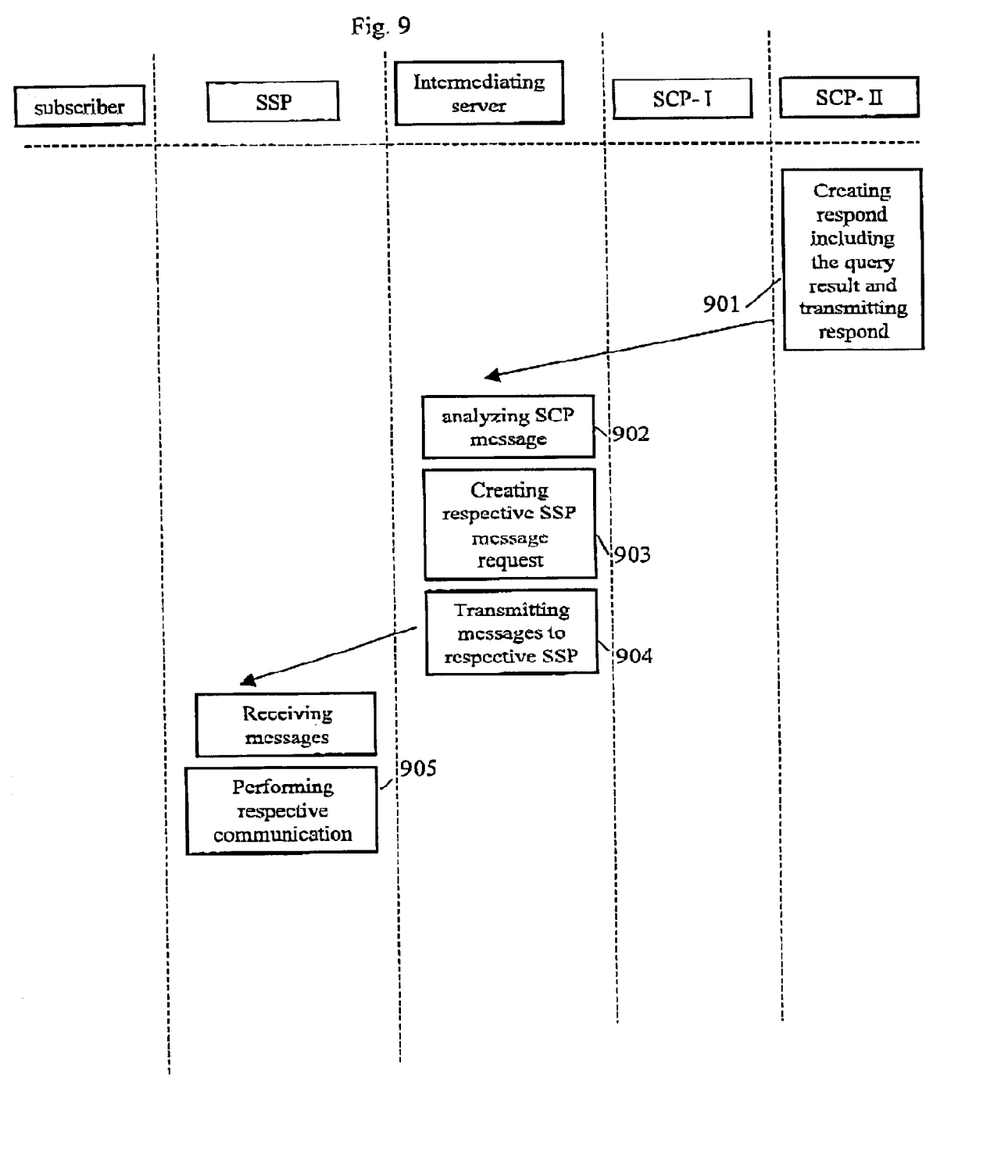

According to the query result a response message is prepared (801), which is transmitted as a response to the original SSP message. This response message is intercepted by the intermediating system, which analyzes the response (802), creates a second SCP message request (803), and transmits the second message to the second SCP (804). The second SCP system receives the message (804), performs a query accordingly and returns the result (901).

According to the query result, a response message is prepared (902), which is identified by the SSP source system. The proper response message adapted to the respective SSP protocol is then created (903). The converted response message is transmitted (904) to the respective SSP system, which performs the respective switching operation (905) based on the response information.

An example for such a scenario is when an operator offers both a prepaid service and a virtual number service and wants to combine the two. The first SSP request will provide the virtual number translation and the second SSP request will provide the prepaid service.

Telecom service providers are provided with a solution for mobile services to be integrated with Intelligent Network services, and with the ability to implement such a solution without the need to implement changes in their existing network software and hardware configuration.

While the above description contains many specifities, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

What is claimed is:

1. A method for mediating between different (SSP) telephone switching message protocols and different control point system (SCP) message protocols, comprising the steps of:

providing an SSP with a message having a first type of message protocols;

providing an SCP with a second type of message protocols not directly communicable with the first type of message protocols;

converting a message from the SSP to a unified service request data format using an SSP conversion module;

routing the converted message to an SCP conversion module;

converting the converted message to the second type of message protocols using the SCP conversion module; and routing the converted message in the second type of message protocols format to the SCP.

2. The method for mediating according to claim 1 wherein a telephone switching system (SSP) can provide Intelligent Network services of more than one control point system (SCP) wherein each SCP has different data protocol, said method comprising the steps of:

a. Receiving a stream of messages from users' SSP based on subscriber call sessions;

b. Converting SSP message into unified message format;

c. Identifying designated SCP type;

d. Creating respective SCP message based on converted message format;

e. Transmitting created message to designated SCP;

f. Receiving response message from the respective SCP;

g. Converting SCP message into SSP message; and h. Transmitting created message to designated SSP.

3. The method for mediating according to claim 1 wherein a telecom provider can use more than one (SSP) telephone switching system to provide Intelligent Network services one control point system (SCP) wherein each SCP has different data protocol, said method comprising the steps of:

a. Receiving a stream of messages from the users SSP based on subscriber call sessions;

b. Identifying SSP protocol format according to predefined logic rules;
c. Converting SSP message into unified message format;
d. Creating respective SCP message based on converted message format;
e. Transmitting created message to designated SCP;
f. Receiving response message from the respective SCP;
g. Identifying designated SSP type;
h. Creating respective SSP message according to SCP message; and
i. Transmitting created message to designated SSP.

4. The method for mediating of claim 1 wherein a telecom provider can use more than one telephone switching system to provide IN services of more than one control point system (SCP) wherein each SCP has different data protocol, said method comprising the steps of:
 a. Receiving a stream of messages from the users SSP based on subscriber call sessions;
 b. Identifying SSP protocol format according to predefined logic rules;
 c. Converting SSP message into unified message format;
 d. Identifying designated SCP type;
 e. Creating respective SCP message based on converted message format;
 f. Transmitting created message to designated SCP;
 g. Receiving response message from the respective SCP;
 h. Converting SCP message into unified message format;
 i. Identifying designated SSP type;
 j. Creating respective SSP message based on converted message format; and
 k. Transmitting created message to designated SSP.

5. The method for mediating of claim 1 wherein a telecom provider can provide an integrated service that combines the services of at least two SCPs, said method comprising the steps of:
 a. Receiving a stream of messages from the users SSP based on subscriber call sessions;
 b. Identifying SSP protocol format according to predefined logic rules;
 c. Converting SSP message into unified message format;
 d. Identifying the integrated service type;
 e. Identifying the required SCP services for performing the integrated service;
 f. Creating respective SCP messages based on converted message format;
 g. Transmitting created message to at least one designated SCP;
 h. Receiving response message from the respective SCPs;
 i. In case the integrated service requires further SCP service creating, proper SCP message, transmitting thereof to designated second SCP, and receiving response;
 j. Converting received SCPs message into unified message format;
 k. Identifying designated SSP type;
 l. Creating respective SSP message based on converted message format; and
 m. Transmitting created messages to designated SSP.

6. A system for mediating between different (SSP) telephone switching messages message protocols and different control point system (SCP) message protocols, said system comprised of:
 a. SSP conversion modules for identifying SSP message definitions and information and creating unified message records;
 b. SCP conversion modules for identification of SSP message definitions and information and creation of unified message records;
 c. Management modules for checking the message destinations and routing the messages accordingly; and
 d. SSP ands SCP protocols database.

7. The system for mediating of claim 6 wherein SCP conversion module creates the proper SCP message according to designated SCP which was identified by the management module, thus enabling one SSP system to provide Intelligent network service of more than one SCP system.

8. The system for mediating of claim 6 wherein SSP conversion module creates unified SSP message according to identified SSP system, thus enabling one SCP system to communicate with more than one SCP system.

9. The systems for mediating of claim 6 wherein the management module further enables integrated service which activates at least two SCP services as result of one user request.

* * * * *